United States Patent [19]
Jones

[11] 4,089,359
[45] May 16, 1978

[54] MUD AND SNOW TIRE CLEATS

[76] Inventor: Jerry J. Jones, P.O. Box 137, Conifer, Colo. 80433

[21] Appl. No.: 773,820

[22] Filed: Mar. 3, 1977

[51] Int. Cl.² ............................................. B60C 27/20
[52] U.S. Cl. .................................... 152/216; 152/218; 152/225 R
[58] Field of Search ............ 152/213 R, 216, 218–219, 152/225 R, 221, 223; 301/47, 50, 51

[56] References Cited

U.S. PATENT DOCUMENTS

| | | | |
|---|---|---|---|
| 2,212,076 | 8/1940 | Rollings | 152/216 |
| 2,434,017 | 1/1948 | Snedeker | 152/216 |
| 2,730,406 | 1/1956 | Fitzgerald | 152/216 |
| 3,016,079 | 1/1962 | Weller | 152/218 |
| 3,847,196 | 11/1974 | Gomez | 152/226 |

*Primary Examiner*—Drayton E. Hoffman
*Assistant Examiner*—Lawrence E. Williams
*Attorney, Agent, or Firm*—Richard D. Law

[57] ABSTRACT

An assembly securely mounted to a wheel of an automotive vehicle to provide continual availability of cleats to be fitted around the treads of a tire for use in driving an automotive vehicle through mud or snow. The assembly consists of a cylindrical plate with a series of round through holes for affixing to a range of automotive wheel configurations with elongated lug nuts and bolts, a series of L-shaped brackets securely affixed around the outside perimeter of the mounting plate, a spring-loaded telescoping shaft extending from each L-shaped bracket parallel to the outside of a vehicle tire, a cleat affixed on the outside end of each telescoping shaft, so that each cleat can be locked in position around the tire treads with the telescoping shaft in the telescoping position and with each cleat further being placed in a locked position near the side of the tire when the telescoping shaft is in a retracted position so as to be out of the way when not in use.

5 Claims, 7 Drawing Figures

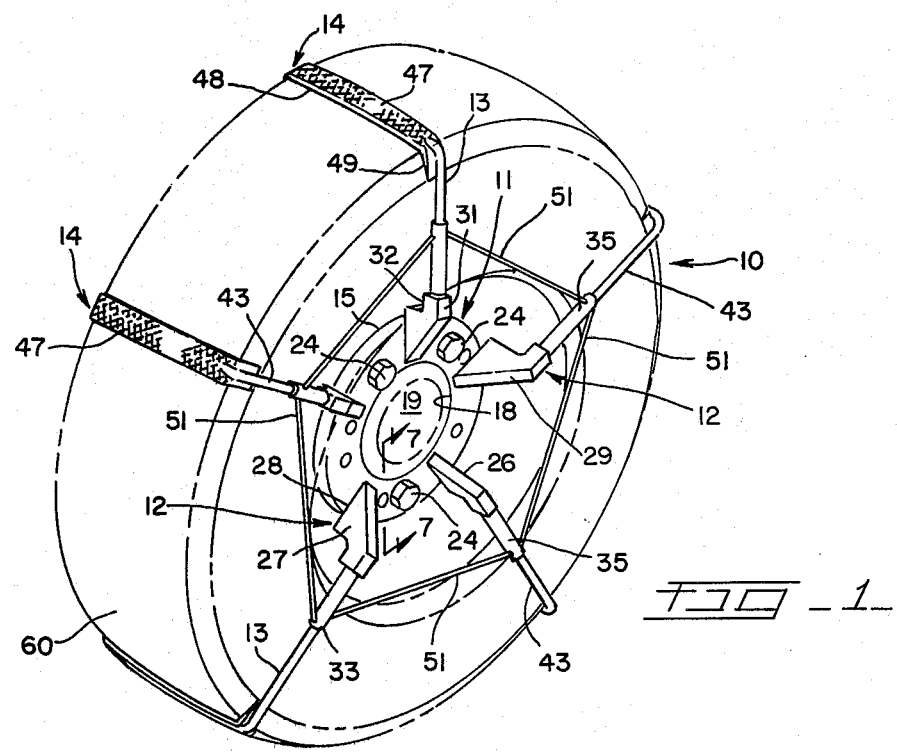
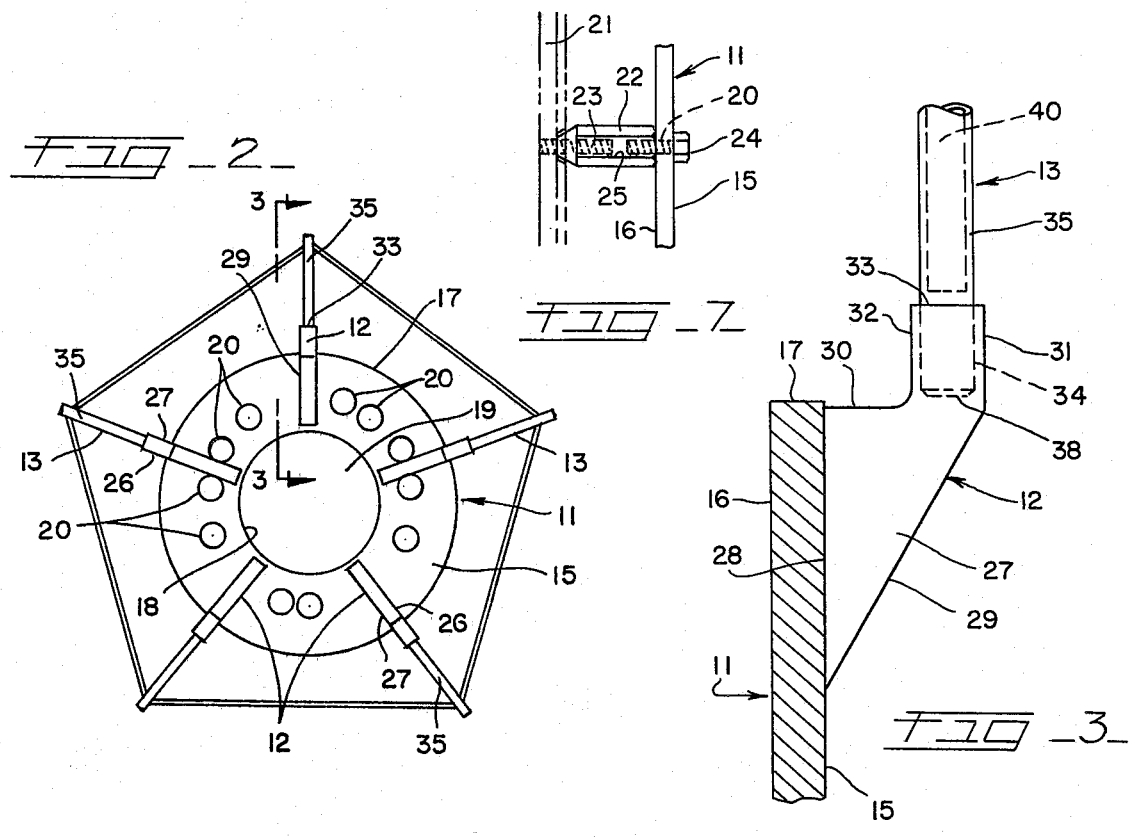

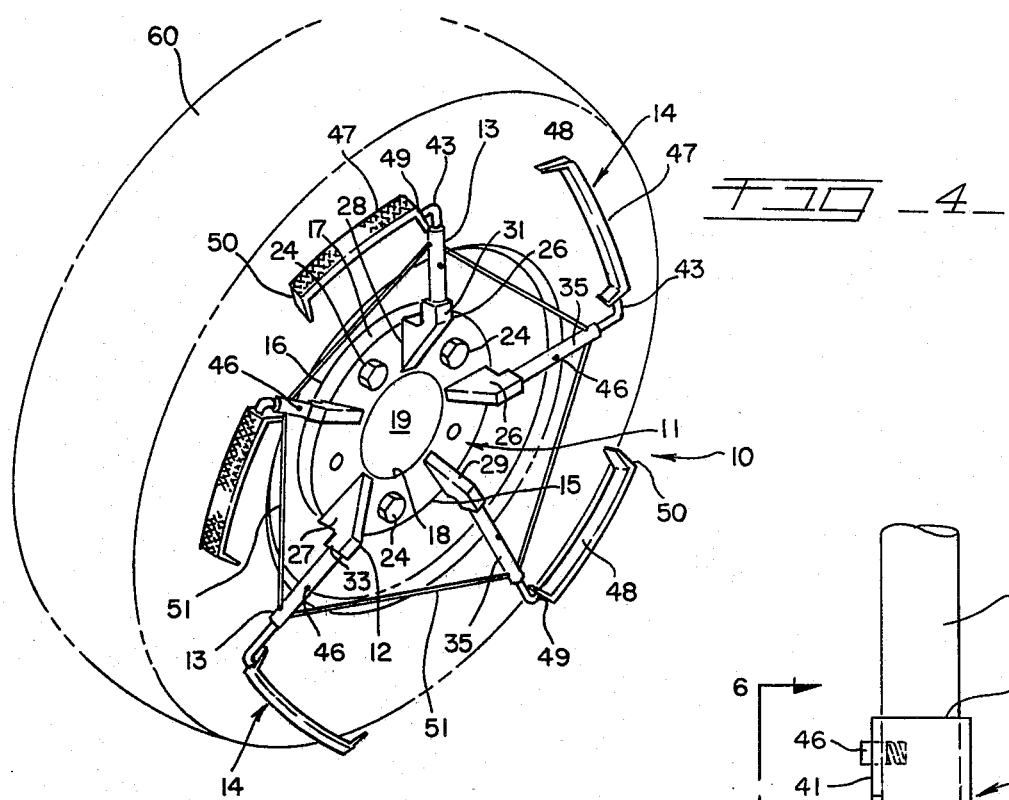
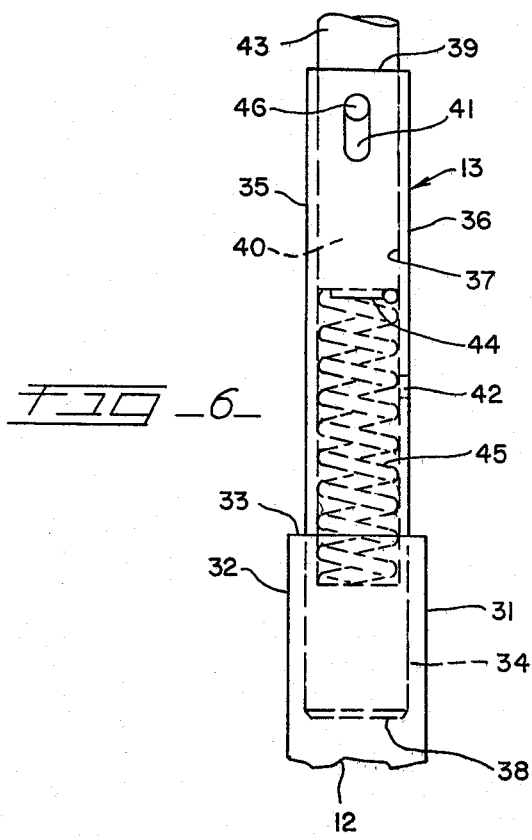
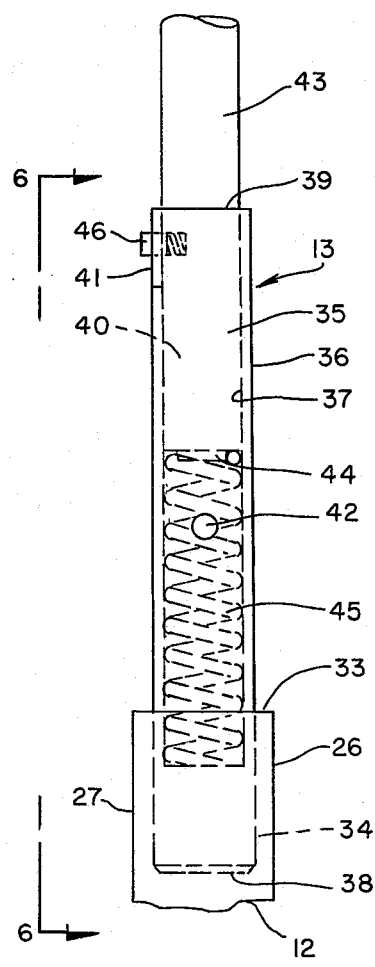

MUD AND SNOW TIRE CLEATS

BACKGROUND OF THE INVENTION

1. Field of the Invention

This invention relates to mud and snow tire cleats securely affixed to the wheels of an automotive vehicle so that they are readily available for driving through mud or snow and which are stored around the outside of a wheel when not in use.

2. Description of the Prior Art

It has always been a problem for drivers of automotive vehicles to readily provide an easy and efficient method for driving through mud or snow. Available techniques include the use of tire chains which are usually cumbersome to mount on automotive tires and which must usually be stored when not in use within a vehicle trunk or passenger compartment so that they take up valuable space therein and they are easy to misplace. Other techniques include tires with specially designed treads, including studded tires, but such tires are generally mounted for the duration of a season, so that they must be used when mud or snow conditions do not exist. There is, then, an obvious need in the marketplace for mud and snow tire cleats which are securely mounted to an automotive vehicle so that they are readily available when required for driving through mud or snow and can be stored out of the way when not in use.

SUMMARY OF THE INVENTION

The present invention provides mud and snow tire cleats which are securely affixed to an automotive wheel so as to be readily available when desired and can be stored out of the way when not used.

It is a feature of the present invention to provide mud and snow tire cleats.

A further feature of the present invention provides mud and snow tire cleats which are easy to use and reliable and efficient in operation.

Yet still a further feature of the present invention provides mud and snow tire cleats which are of a rugged and durable construction and which, therefore, may be guaranteed by the manufacturer to withstand rough and continual usage.

An additional feature of the present invention provides mud and snow tire cleats which are simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of mud and snow tire cleats affixed around the treads of an automotive tire; and FIG. 2 is a front view of the mount plate assembly; and FIG. 3 is a side sectional view of an L-shaped mounting bracket; and FIG. 4 is a perspective view of the mud and snow tire cleats shown in a storage position around the outside of an automotive tire; and FIGS. 5 and 6 are side sectional views of the spring-loaded telescoping member; and FIG. 7 is a side sectional view of an elongated lug bolt and nut.

DESCRIPTION OF THE PREFERRED EMBODIMENT

Referring now to the drawings in detail, there is illustrated a preferred form of the mud and snow tire cleats constructed in accordance with the principles of the present invention and which is designated generally in its entirety by the reference numeral 10 and which is comprised of a mounting plate 11, a series of L-shaped brackets 12, a series of spring-loaded telescoping members 13, a series of tire cleats 14, and associated hardware and interconnecting components as will be later described.

A mounting plate 11 is constructed of durable material, such as steel plate, and is cylindrical in configuration having a front surface 15, and opposed rear surface 16, a round end surface 17, and a round inside surface 18 to form the large round opening 19 for positioning of the mounting plate 11 over the hub of an automotive vehicle wheel. A series of round through holes 20 are provided at predetermined locations within the mounting plate 11 so as to be disposed between the inside surface 18 and the end surface 17 with the arrangement of the holes 20 predetermined to match the threaded holes provided on a variety of automotive vehicle wheels, such as are provided on various makes of automobiles. The mounting plate 11 is secured to the vehicle wheel hub 21, as shown in FIG. 7, by threadibly attaching an elongated hub nut 22 on one end to a threaded bolt 23 conventionally provided with a hub 21 on an automotive vehicle, and with the mounting plate 11 being secured to a series of nuts 22 by assembling a series of bolts 24 through the proper round through holes 20 for threadable attachment into the opposite end of the hub nuts 22, so that the mounting plate 11 is securely affixed to the hub 21 so as to be parallel thereto and located a short distance outwardly therefrom. The hub nut 22 is a conventional type hub nut, except that it is provided longer in length and with a threaded through hole 25 along its length so as to provide for the assembly just described.

The L-shaped brackets 12 are constructed of durable material, such as steel plate, and consist of opposed side surfaces 26 and 27, a flat end surface 28, and surface 29 which is angularly disposed to the end surface 28, and, as shown in FIG. 3, an intermediate surface 30 which is disposed perpendicularly to the end surface 28, the front and rear surfaces 31 and 32 respectively which project into an L-shaped configuration upwardly from and perpendicularly to the intermediate surface 30 so as to be parallel with each other, and a top surface 33. The top surface 33 is provided with a round hole 34 extending into the L-shaped bracket 12 from the top surface 33 to near the intermediate surface 30.

A series of L-shaped brackets 12 are securely affixed so as to be spaced equidistantly around the front surface 15 of the mounting plate 11 with the end surfaces 28 of the L-shaped brackets 12 being affixed thereto, such as by welding, and so as to be spaced between the round through holes 20.

The telescoping members 13 consist of a cylindrical hollow member 35 having an outside surface 36 and an opposed inside surface 37, and an enclosed bottom surface 38, and an open top surface 39 to form the interior compartment 40 along the length of the cylindrical hollow member 35. The cylindrical hollow member 35 is further provided with an elongated through slot 41 disposed in a vertical direction a short distance below the top surface 39 and facing in the direction of the side surface 27 of the L-shaped bracket 12, and is further provided with a round through hole 42 located nearly centrally along the length of the hollow member 35 so as to face in the direction of the front surface 31 of the L-shaped bracket 12. The cylindrical hollow member 35 is further assembled, as shown in FIGS. 5 and 6, into the round hole 34 in the L-shaped bracket 12 and is securely affixed therein in a conventional way, such as by welding. The telescoping members 13 further consist of an extendable member 43 which is cylindrical in configuration and is constructed of durable material, such as steel rod, with an outside diameter to provide a snug fit within the interior compartment 40 of the cylindrical hollow member 35 wherein the bottom surface 44 of the member 43 is compressed against the spring 45. A spring-loaded pin 46 is provided in the extendable member 43 a short distance upwardly from the bottom surface 44 and is provided to protrude outwardly from the member 43 when in a relaxed position and receeds internally member 43 when fully depressed, with the member 43 thereby being locked in position within the interior compartment 40 when the pin 46 is relaxed and positioned within the elongated slot 41 or the round through hole 42, and with the member 43 thereby also being free to be turned or moved in an up or down direction when the pin 46 is fully depressed.

The cleats 14 are constructed of durable material, such as steel, and consist of a serrated or spike-like top surface 47, an opposed bottom surface 48 which is slightly rounded to match the configuration of tire treads, and two opposed flanges 49 and 50 integrally conjoining the top surface 47 and the bottom surface 48 so as to protrude downwardly therefrom and with the spacing between the flanges 49 and 50 determined by the width of a tire 60. The flange 49, as shown in FIGS. 1 and 4, is securely affixed to the top of the extendable member 43 in a conventional way, such as by welding, so that when the spring-loaded pin 46 is positioned within the elongated slot 41, the cleats 14 are positioned over the tire treads, and, when the pin 46 is positioned within the hole 42, the cleats 14 are turned 90° from the position over the tire treads and so as to be positioned downwardly from the tire treads and parallel to the sides of the tire 60. Each of the telescoping members 13 are tied together by a series of truss rods 51 which consist of lengths of solid cylindrical rods, such as steel rods, and are secured on each of their ends, such as by welding, to the outside of the respective cylindrical hollow members 35 so as to provide a rigid assembly between each of the telescoping members 13.

In operation, a number of lug nuts are removed from the wheel of an automotive vehicle and are replaced by a number of hub nuts 22 which are threadably attached to the already provided bolts 23, with the mounting plate 11 then being properly aligned by aligning the holes 20 to the threaded through holes 25 on the hub nuts 22 and then being secured thereto by means of the bolts 24. When it is then desired to drive through mud or snow, a spring-loaded pin 46 is fully depressed to enable the user to position the extendable member 43 within the interior compartment 40 of the member 35 so that the pin 46 is released within the elongated slot 41 and the tire cleats 14 are positioned over the treads of the tire 60. When in the process of driving, the cleats 14 will give along the length of the elongated slot 41 when the cleats 14 are turned between the bottom of the tire 60 and a road surface by being forced against the spring 45 which will in turn return the cleats 14 to a normal position as the tire 60 further revolves. When driving on the dry or otherwise normal road surface the spring-loaded pin 46 is fully depressed within the member 43, the cleats 14 are lifted off the treads of the tire 60, are then rotated 90° so that the member 43 might be pushed within the interior compartment 40 of the member 35 to allow the pin 46 to be positioned within the hole 42, as shown in FIG. 4, so that the cleats 14 are securely positioned out of the way along the side of the tire 60. When it is desired to repair or replace the cleats 14 due to damage or wear, the spring-loaded pin 46 is fully depressed within the member 43, so that the extendable member 43 can be removed from member 45, with a new or repaired cleat 14 being replaced by reversing the above described procedure.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. Mud and snow tire cleats securely mounted to the wheel of an automotive vehicle which can be easily and conveniently positioned around the treads of a tire for driving through mud or snow and which can be stored at the side of the tire when not in use, the device comprising, in combination:

a cylindrical mounting plate having a front and opposed rear surfaces, a round end surface, and a round inside surface to form a large round opening for positioning of said mounting plate over the hub of an automotive vehicle wheel, with a series of round through holes provided at predetermined locations around the mounting plate to match the threaded studs provided on a variety of automotive vehicle wheels, with the mounting plate being secured to the vehicle wheel hub by means of a series of elongated hub nuts to affix the mounting plate a short distance outwardly from said wheel hub; and a series of L-shaped brackets consisting of opposed side surfaces, a flat end surface, a front surface angularly disposed to said end surface, an intermediate surface disposed perpendicularly to said end surface, and front and rear surfaces projecting into an L-shaped configuration upwardly from and perpendicularly to said intermediate surface, and a top surface provided with a round hole therein extending into the L-shaped bracket from the top surface to near said intermediate surface, with said series of L-shaped brackets being securely affixed to said mounting plate so as to be spaced equidistantly around the front surface of said mounting plate and so as to be spaced between said round through holes therein; and a series of telescoping members consisting of a cylindrical hollow member and a solid extendable member, a cylindrical hollow member being provided with an elongated through slot disposed in a vertical direction a short distance below its top surface and a round through hole located nearly centrally along the length of the hollow member so as to be disposed 90° from said elongated through slot, said hollow member being further provided with a spring assembled therein for assembly of the extendable member thereagainst, the extendable member being provided with a spring-loaded pin a short distance upwardly from its bottom surface for locking of the extendable member into said elongated slot or through hole in said hollow member; and a series of cleats consisting of a serrated or spike-like top surface, an opposed bottom surface slightly rounded to match the configuration of tire treads, and opposed flanges integrally conjoining said top surface and bottom surface so as to protrude downwardly therefrom and with a spacing between said flanges determined by the width of the vehicle tire, with said cleats further being securely affixed to the top of said extendable member so that when said spring-loaded pin is positioned within said elongated slot, said cleats are positioned over the tire treads, and, when said pin is positioned within said round through hole in said hollow member, said cleats are turned 90° from the position over the tire treads so as to be positioned downwardly from said tire treads and parallel to the sides of the vehicle tire; and a series of truss rods consisting of lengths of solid cylindrical rods secured on each of their ends between said cylindrical hollow members so as to provide rigid assembly between each of said telescoping members.

2. Mud and snow tire cleats as set forth in claim 1 wherein a series of cleats are securely affixed to the hub of a vehicle wheel to provide easy access to said cleats when an individual drives through mud or snow, and with said tire cleats being stored at the side of a vehicle tire when not in use.

3. Mud and snow tire cleats as set forth in claim 1 wherein said mounting plate is provided with a series of round through holes so as to provide a fit for a variety of automotive vehicles.

4. Mud and snow tire cleats as set forth in claim 1 wherein said mounting plate is mounted to a vehicle wheel hub by means of a series of elongated hub nuts provided with a threaded through hole along the length thereof for threaded assembly to threaded studs conventionally provided on a vehicle wheel and said mounting plate being affixed on the other end by means of a conventional bolt.

5. Mud and snow tire cleats as set forth in claim 1 wherein said extendable members are provided with a spring-loaded pin which can be fullu depressed so as to permit removal of said extendable member from said hollow cylindrical member for purposes of replacement of damaged cleats or repair thereto.

* * * * *